United States Patent
Yaqub et al.

(10) Patent No.: US 11,354,864 B2
(45) Date of Patent: Jun. 7, 2022

(54) SYSTEM AND METHOD FOR PRESENTING LOCATION BASED AUGMENTED REALITY ROAD SIGNS ON OR IN A VEHICLE

(71) Applicants: Raziq Yaqub, Owens Cross Roads, AL (US); Kaveh Heidary, Huntsville, AL (US); R Barry Johnson, Huntsville, AL (US)

(72) Inventors: Raziq Yaqub, Owens Cross Roads, AL (US); Kaveh Heidary, Huntsville, AL (US); R Barry Johnson, Huntsville, AL (US)

( * ) Notice: Subject to any disclaimer, the term of this patent is extended or adjusted under 35 U.S.C. 154(b) by 0 days.

(21) Appl. No.: 16/282,234

(22) Filed: Feb. 21, 2019

(65) Prior Publication Data

US 2019/0259208 A1 Aug. 22, 2019

Related U.S. Application Data

(60) Provisional application No. 62/633,073, filed on Feb. 21, 2018.

(51) Int. Cl.
| | |
|---|---|
| *G06T 19/00* | (2011.01) |
| *G09G 5/38* | (2006.01) |
| *G08G 1/0967* | (2006.01) |
| *G06T 17/05* | (2011.01) |
| *B60K 35/00* | (2006.01) |

(52) U.S. Cl.
CPC .......... *G06T 19/006* (2013.01); *G06T 17/05* (2013.01); *G08G 1/096766* (2013.01); *G09G 5/38* (2013.01); *B60K 35/00* (2013.01); *B60K 2370/1529* (2019.05); *B60K 2370/16* (2019.05); *G09G 2354/00* (2013.01)

(58) Field of Classification Search
None
See application file for complete search history.

(56) References Cited

U.S. PATENT DOCUMENTS

| | | | |
|---|---|---|---|
| 9,648,107 B1* | 5/2017 | Penilla | G06F 3/0482 |
| 2007/0194950 A1* | 8/2007 | Boss | G08G 1/0962 |
| | | | 340/905 |

(Continued)

OTHER PUBLICATIONS

Federal Highway Administrator, "The Manual on Uniform Traffic Control Devices (MUTCD)", (2009) (Year: 2009).*

*Primary Examiner* — Steven Z Elbinger
(74) *Attorney, Agent, or Firm* — The Keys Law Firm PLLC (57) ABSTRACT

A system and method for presenting location-based augmented reality road signs on or within a vehicle includes a database, a plurality of transmitters, and a plurality of vehicle integrated receivers. The database is held in a computer network accessible location and stores a plurality of datasets. The plurality of transmitters are connected to the database through the computer network and broadcast area-relevant datasets from the database wirelessly in a defined geographic coverage area. The plurality of vehicle integrated receivers are operative to receive area-relevant datasets and use the information therein to determine when a particular road sign is required and then generate a standardized road sign image for the required road sign and display the image on or in the vehicle as an augmented reality projection.

20 Claims, 7 Drawing Sheets

(56) References Cited

U.S. PATENT DOCUMENTS

| | | | | |
|---|---|---|---|---|
| 2007/0242131 | A1* | 10/2007 | Sanz-Pastor | H04L 51/20 |
| | | | | 348/14.02 |
| 2013/0293582 | A1* | 11/2013 | Ng-Thow-Hing | G06T 19/006 |
| | | | | 345/633 |
| 2013/0297124 | A1* | 11/2013 | Be | B60W 10/02 |
| | | | | 701/22 |
| 2015/0175068 | A1* | 6/2015 | Szostak | B60K 35/00 |
| | | | | 340/435 |
| 2015/0325027 | A1* | 11/2015 | Herman | A63F 13/428 |
| | | | | 345/633 |
| 2016/0203651 | A1* | 7/2016 | Heath | G06Q 50/30 |
| | | | | 705/13 |
| 2017/0127289 | A1* | 5/2017 | Belz | H04W 40/244 |
| 2017/0301318 | A1* | 10/2017 | Nishimura | B60R 16/023 |
| 2017/0337744 | A1* | 11/2017 | Martin | G01S 19/14 |
| 2018/0093678 | A1* | 4/2018 | Wind, III | G08G 1/166 |
| 2018/0176730 | A1* | 6/2018 | Szymczyk | H04W 4/022 |

* cited by examiner

SYSTEM AND METHOD FOR PRESENTING LOCATION BASED AUGMENTED REALITY ROAD SIGNS ON OR IN A VEHICLE

CROSS REFERENCE TO RELATED APPLICATIONS

This application claims the benefit of and incorporates by reference co-pending U.S. provisional patent application Ser. No. 62/633,073 filed Feb. 21, 2018.

BACKGROUND OF THE INVENTION

Field of the Invention

This invention relates to a system and method for causing an automatic, location based augmented reality display of road related information on or within a vehicle.

Description of the Prior Art

The use of fixed and temporary road signs or other traffic control devices to give instructions or provide information to road users is well established. Such road signage is designed to help improve safety on roadways, including streets and highways, making it easier for drivers to understand and follow the rules of the road as well as to navigate to their destination safely. Typically, such road signage is embodied as physical signs which are erected at the side of or above roads.

Mounting physical signs next to or above the roadways has several issues, however, including the substantial upfront costs associated with erecting them, the ongoing costs associated with maintaining them, and in some cases the lack of a suitable locations to place them. For example, the cost of a cantilever sign may range from $15,000 to $20,000 each, and the cost of a bridge type sign may range from $30,000 to $60,000 each. And once erected, physical signs require regular maintenance of both the signs and sign supports. Indeed, it seems as if physical road signs go missing or become damaged for many reasons, including severe weather, car accidents and even theft may lead to a need to repair or replace all or part of a physical a sign.

Moreover, the use of physical signage also raises the issue of the proper placement of such a sign. To be effective and safe, a physical sign must allow drivers to navigate safely while simultaneously locating and reading signage. In practice, however, many locations do not provide an optimal place or make it exceedingly difficult to find an effective place to place a sign. As a result, when drivers try to locate and read signage that is not optimally placed, there may be a reduction in reaction time and an increase in unsafe driving that become a cause of accident Accordingly, what is needed is a system and method which eliminates the need for physical signage that is positioned along roads by automatically causing the display of location relevant road related information within a vehicle.

SUMMARY OF THE INVENTION

The present disclosure describes a system and method for presenting location based augmented reality road signs on or within a vehicle. The system and method for presenting location based augmented reality road signs on or within a vehicle includes a network connected database which stores a plurality of datasets which organize data into categories: signage legend, signage template, and signage location; a plurality of transmitters which are each communicatively connected to the database and broadcast area-relevant datasets wirelessly in a defined geographic coverage area; and a plurality of vehicle integrated receivers which are operative to receive area-relevant datasets and use the information therein to determine when a particular road sign is required and then generate a road sign image and display the image on or in the vehicle as an augmented reality projection.

It is an object of this invention to provide a system and method which eliminates the need for physical signage that is positioned along roads by causing the automatic generation of road related information within a vehicle.

These and other objects will be apparent to one of skill in the art.

DETAILED DESCRIPTION OF THE INVENTION

Figure 1:
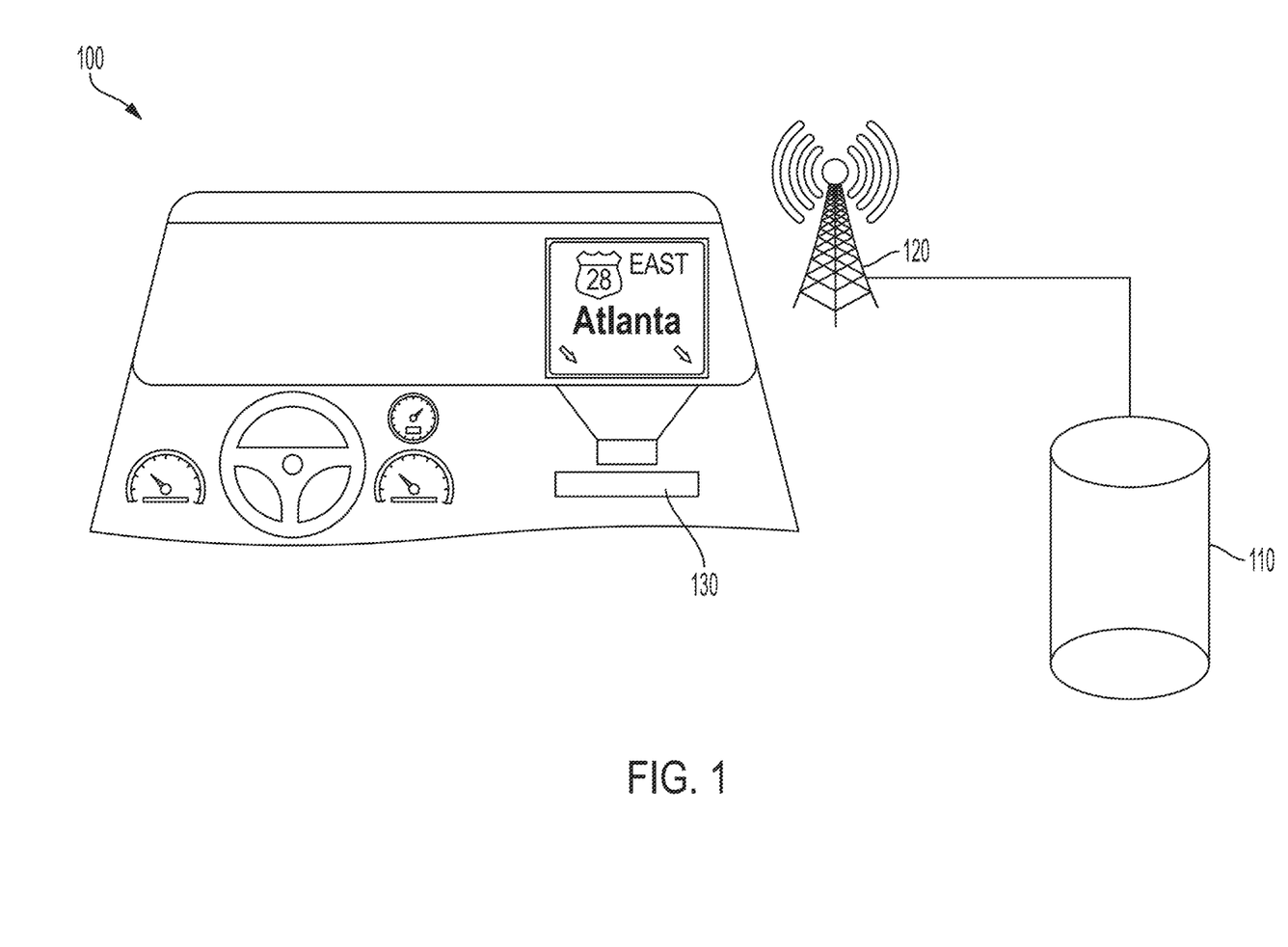
FIG. 1 shows the components of a system for presenting location based augmented reality road signs on or within a vehicle in accordance with the present invention.

Referring now to the drawings and in particular FIG. 1, a system 100 for location based augmented reality road signs within a vehicle is implemented through a database 110 that stores information related to the content and location of road signs ("signage information"), a collection of transmitters 120 deployed in a service area that transmit the signage information, and a receiver 130 installed in each vehicle to receive the transmitted signage information and cause the display of applicable signage within the vehicle.

The database 110 contains datasets having data organized into three categories: signage legend, signage template, and signage location. Signage legend data includes data which defines the various types of signs which will need to be displayed, such as regulatory signs (such as "Stop," "Yield," "Speed Limit," and so forth), warning signs (such as "Lane Merges," "Lane Ends," "Uneven Pavement," and so forth), and guide signs (such as "Highway No._" "Food/Lodging/Gas Exit", milepost signs, and so forth). Signage legend data may include entries for signs which contain a variable or changeable message which can be used to inform road users of variable situations. For example, a Speed Limit sign may include a variable speed limit which depends on the time of the day. It is contemplated that such variation may be particularly helpful along congested traffic corridors or during unfavorable weather conditions.

The signage template data includes the data necessary to define the template of a sign to be displayed. As such, for each type of sign that may be displayed, as provided in the signage legend data, the signage template data will include information such as the appropriate sign writing color, sign background color, and signage shape.

Figure 1A:
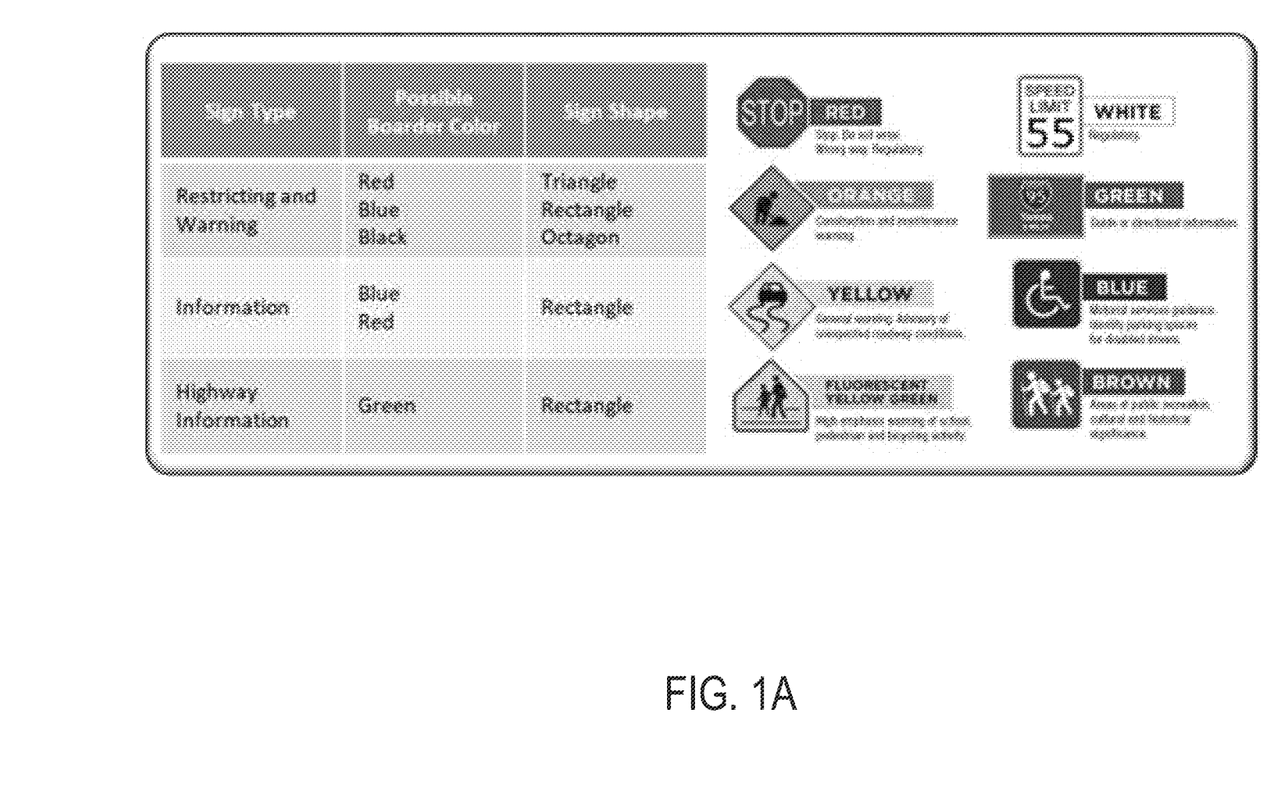
FIG. 1A shows examples of signage template in compliance with the Manual Uniform Traffic Control Devices for Streets and Highways.

The signage template data may be provided in compliance with the Manual Uniform Traffic Control Devices for Streets and Highways, with some of the prevailing signage templates as shown in FIG. 1A.

The signage location data includes data which defines the appropriate location of signs which will be generated. Such location information may be stored as two-dimensional arrays, such as in Degrees, Minutes, and Seconds (e.g. 41° 24'12.2"N 2° 10'26.5"E), in Degrees and Decimal Minutes (e.g. 41 24.2028, 2 10.4418), or in any other state of the art format.

Each transmitter 120 in the system 100 for location based augmented reality road signs within a vehicle defines a fixed location-based data distribution center. In this regard, the transmitters 120 are each positioned at a predetermined location, are connected to the database through a computer network, such as the Internet, and are operative to broadcast a localized wireless signal which includes signage legend data, signage template data, and signage location data which is relevant for the predetermined location as data triplets. The first piece of the triplet, signage legend data, defines the content of the signage that guides, warns, or informs the drivers and which is to be generated. As an example, signage legend data for a specified location may be defined as "Huntsville Downtown Exit—2 Miles," "Food Exit—¾ Miles," "Speed Limit 35 MPH," "Museum—Next Exit," and so forth.

The second piece of the triplet, signage template data, pertains to the required appearance of the signage which is to be generated. It contains the information related to legend (i.e., the writing on the sign) color, background color, borders and shape of the signage. As an example, the template of the signage related to Speed Limit has black legend, white background, and rectangular shape, and a template of a signage related to "Huntsville Downtown Exit—2 Miles," has white legend, green background, and rectangular shape.

The third piece of the triplet, signage location data, pertains to the geolocation at which the signage which is to be generated will be displayed. It is appreciated that conventional physical road signs are location-based indicators and so the signage which will be generated by the system 100 for location based augmented reality road signs within a vehicle must be presented at specific places. For example, a freeway "Exit" guide signs may be desirably provided 2 miles, 1 mile, ½ mile ahead of the exit, and right at the exit area, just as physical signage may commonly be placed.

Figure 2:
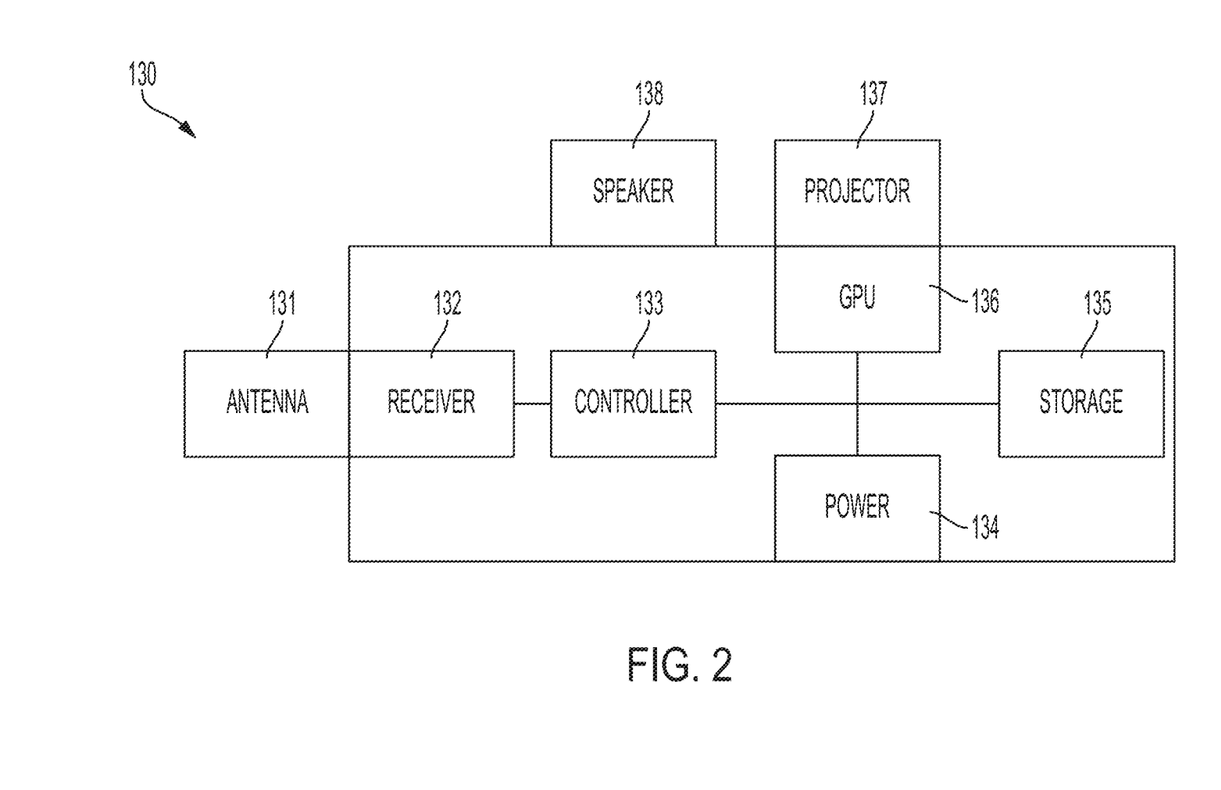
FIG. 2 shows the internal components a receiver of a system for presenting location based augmented reality road signs on or within a vehicle built in accordance with the present invention

Each receiver 130 in the system 100 for location based augmented reality road signs within a vehicle is disposed in a vehicle and operative to receive the data triplets from the transmitters 120 and cause the display of a sign in the vehicle in which it is disposed in accordance with the data received from a given transmitter 120. Referring now to FIGS. 1 and 2, each receiver 130 may include an antenna 131 and a radio receiver 132 which allows the receiver 130 to receive wireless signals and convert the wireless signals to a useable form for a controller 133 that is disposed in the receiver. The controller 133 is operatively connected to an internal power source 134, a storage medium 135, and a graphics processing unit 136, with the controller further including software which enables it to cause the graphics processing unit 136 to produce an image to be projected by a projector 137. The projector 137 may define a projector which causes an image produced by the graphics processing unit 136 to be projected in augmented reality using the curvature of the windshield glass of the vehicle in which the receiver 130 is disposed.

In some embodiments, the controller 133 may also be operatively connected to a speaker 138.

In some embodiments, the controller 133 may include an integral satellite-based navigation system in order to be able to track the geolocation of the receiver 130 (and by extension, the vehicle in which the receiver 130 is disposed). For example, the controller 133 may be operatively connected to a Global Positioning System ("GPS") receiver (not shown) so as to receive geolocation position in real time therefrom. It is contemplated that such a GPS receiver may be an internal component of the receiver 130 or be embodied as or a part of a discrete device that is sufficiently connected to the receiver 130 that the receiver may receive electrical signals relating to real time geolocation therefrom. In addition or in the alternative to a satellite-based navigation system, multilateration of radio signals between transmitters 120 (or other radio signal transmitters) and the receiver 130 may be employed to track the geolocation of the receiver 130.

It is appreciated that the projector 137 may be employed with conventional items which are used to provide head-up displays using augmented reality images, including mirrors, light traps, and glare traps.

In operation, upon receipt of a wireless signal from a transmitter 120, a given receiver 130 processes the first piece of data to construct a human readable legend to be displayed. The receiver 130 then utilizes the second piece of data to select and prepare the correct template of signage to be displayed. The receiver 130 employs the third piece of data to identify the appropriate geolocation for the applicable signage to be displayed so that once the vehicle's current location equals the identified location, the signage can be displayed by the receiver 130.

The receiver 130 then crafts a digital sign image (from the legend and the template) that mimics the real sign. As such, digital sign image is prepared in compliance with the Manual Uniform Traffic Control Devices for Streets and Highways.

The receiver 130 then projects the locally crafted sign image on the vehicle's windscreen exactly when the vehicle arrives at a designated locations (e.g., when the vehicle is 2 miles ahead, 1 mile ahead, ½ mile ahead of the exit, and right at the exit area). It is appreciated that the projection may be done far enough in advance that the driver can see the signage and then respond to the signage before reaching the location.

As the digital sign is being produced locally, it is appreciated that the receiver 130 may keep projecting the digital sign until the vehicle arrives the location (that was otherwise designated for a physical signage), and then remove projection when the vehicle arrives at that location. In addition, in some instances the receiver 130 may project the signage with reasonable visual or auditory effects. These effects may include a gradual approach effect, defined by the virtual signage appearing to approach closer gradually from the corner of the windshield as the driver approaches towards a location (that was otherwise designated for a physical signage). In such a scenario, as the driver passes the precise location, the signage may disappear.

An auditory effect may make provide the content of a sign audible, essentially creating talking signage. Advantageously, talking signage could eliminate potential distractions from a visual signage projection.

The receiver 130 may also keep projecting some of the signage throughout a drive. For example, Speed Limit signage may continue to project along a route, and keep updating and refreshing the display as the speed limit changes.

It is contemplated that in processing the second piece of data, the receiver 130 may additionally reference local data pertaining to sign templates which is stored in memory therein. Advantageously, storing sign template data in the receiver 130 reduces the amount of data which must be transmitted in order to for the receiver to generate signage.

The communications between the transmitters 120 and the receivers may be implemented through existing state of the art cellular communication networks, or may have its own standalone, dedicated network. In either case data transmission may utilize state of art encryption/decryption techniques.

A dedicated, standalone network may also be deployed to serve specific audience such as, for example, military or defense forces. Advantageously, in such an implementation signage data from a dedicated network would be received by only specific audience, and on only specific vehicles. Thus, would also allow command post to define and transmit a new route guide signs for the troops/convoys who perceive route security threat, or likelihood of violence.

In instances where deployment of dedicated network for specific audience such as, military or defense forces is not feasible, the public network may be harnessed by using diversified encryption keys. Thus public network may offer diversified applications, for diversified audience, by using diversified keys for encrypting the signage data, and that may be decrypted only by those who have that specific key to decrypt the received signage data.

Another application of the system 100 for location-based augmented reality road signs within a vehicle could be assigning temporary signage to the undeveloped roads or ad hoc buildings in evolving military bases in foreign lands for use by logistics managements and military convoy operations. The signage can be changed as the base evolves. The virtual signage, visible to the targeted audience, would also enhance security and confidentiality of military locations and operations.

Figure 3:
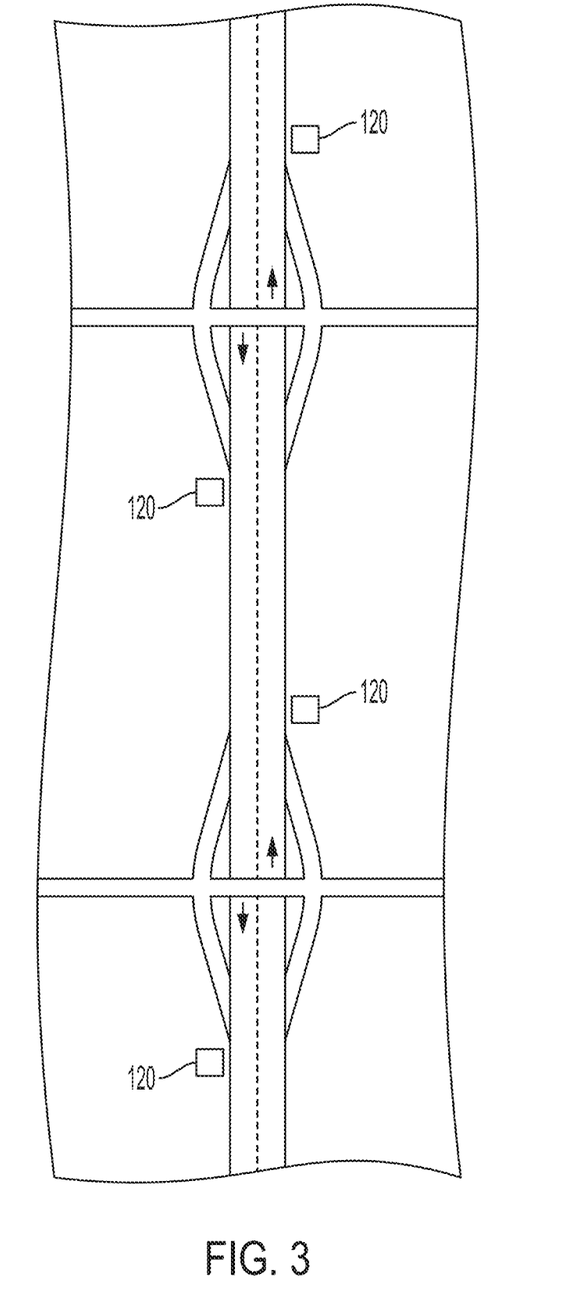
FIG. 3 shows an example of the positioning of transmitter components of a system for presenting location based augmented reality road signs on or within a vehicle on an exemplary roadway in accordance with the present invention.

Referring now to FIG. 3, a plurality of discrete transmitters 120 may be deployed at desired points along a route in order to provide the data triplets for signage pertinent to the upcoming area. In some embodiments, transmitters 120 may be positioned at or after entrances to the roadway in order to ensure that each vehicle receives the required data triplets for upcoming signage.

Figure 4A:
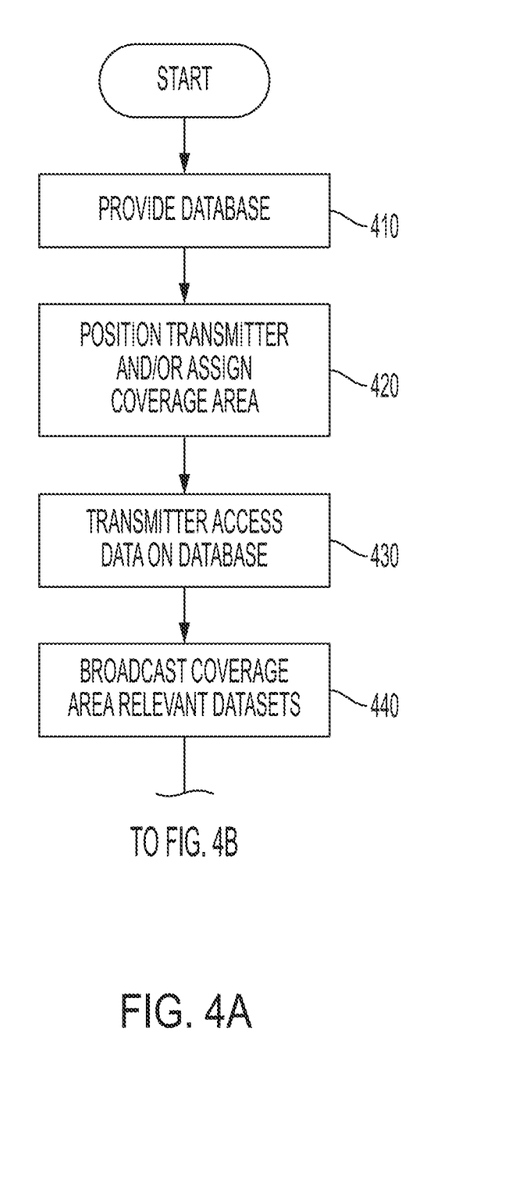
FIG. 4A shows a process which enables the generation of location based augmented reality road signs to be presented on or within a vehicle in accordance with the present invention.

Referring now to FIG. 4A, the process which enables the generation of location based augmented reality road signs within a vehicle begins with the provision of a database at step 410 which, as discussed above, includes datasets having signage legend data, signage template data, and signage location data which can be used to produce the required signs in a particular area. It is contemplated that such a database may be stored on a storage medium in a cloud-based datacenter or otherwise be stored on a storage medium in a datacenter that is accessible over a computer network, such as the Internet.

Once a database has been provided and availed over a computer network, the transmitters in the system for generating location-based augmented reality road signs within a vehicle are positioned in a specific geographic location in geographic coverage area or otherwise assigned a geographic coverage area that is within range of the location from which the transmitter will be broadcasting at step 420. Each transmitter which will be operating in the system can then access the database and retrieve (or otherwise be provided) the datasets from the database that are desired to be broadcast in the geographic coverage area for the respective transmitter at step 430. Once the relevant datasets for the geographic coverage area for the respective transmitter are obtained, the transmitter broadcasts a wireless signal which includes the datasets relevant to the geographic coverage area at step 440. It is contemplated that for each broadcasting transmitter, the area-relevant datasets will include the signage legend data, signage template data, and signage location data which can be used to produce the required signs in the geographic coverage area.

Figure 4B:
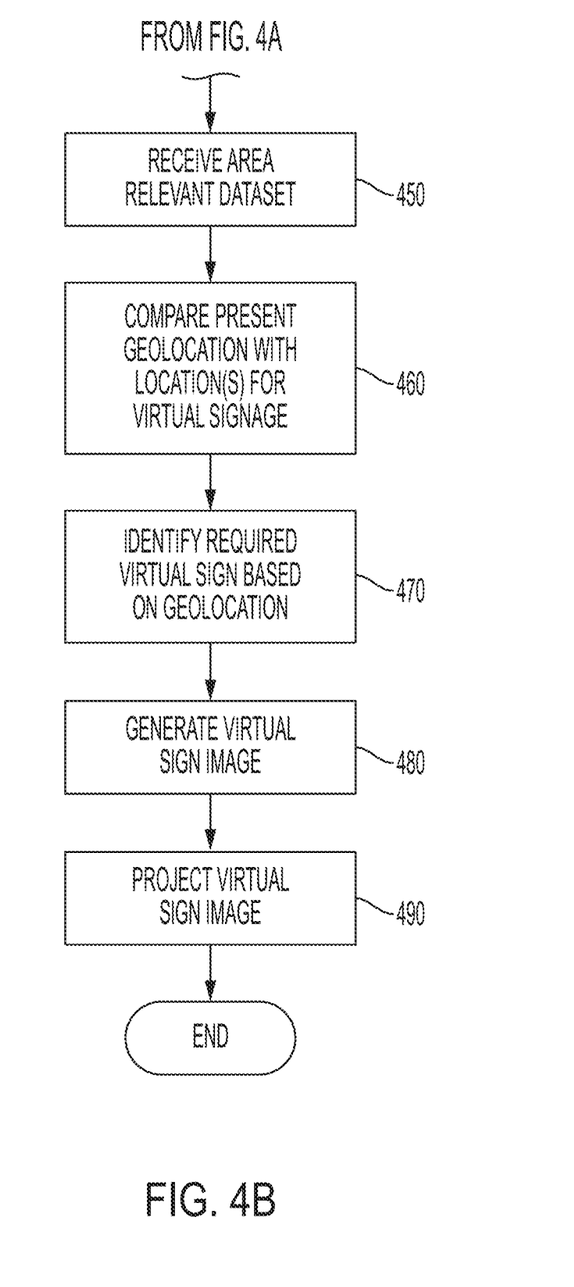
FIG. 4B shows a process for presenting location based augmented reality road signs on or within a vehicle in accordance with the present invention.

Referring now to FIG. 4B, the process for generating location-based augmented reality road signs within a vehicle begins once the area-relevant datasets retrieved from the database are broadcast by a transmitter for a geographic coverage area at step 440. Upon a vehicle which has a receiver for the system for generating location-based augmented-reality road signs within a vehicle installed therein and which is driving in the geographic coverage area may receive the wireless transmission of the area-relevant datasets at step 450. The receiver then tracks the present geolocation of the vehicle in which the receiver is disposed and compares the present geolocation to the locations in the area-relevant dataset which require the display of a virtual sign at step 460. Once the present geolocation of the vehicle matches a location in the area-relevant dataset which requires the display of a virtual sign, the receiver identifies which sign is required at step 470 and utilizes the signage legend data and signage template data for the required sign to produce an image of the required virtual sign at step 480. The image of the sign may then be projected on the front windshield (or other surface of the vehicle) in augmented reality as a heads up display at step 490.

In other embodiments, the receiver may generate images of the virtual signs in an area-relevant dataset upon or following the receipt of the area-relevant dataset from a transmitter and simply cause a particular generated sign image to be project upon the geolocation of the vehicle equaling the location which requires the particular generated sign.

Once the receiver begins projecting a virtual sign, the receiver may keep projecting the virtual signage on the vehicle's windscreen until a predetermined period of time has elapsed or until the vehicle gets to a predetermined endpoint, as tracked by the vehicle's geolocation, and before automatically removing the virtual signage when vehicle has passed the designated location.

Figure 5:
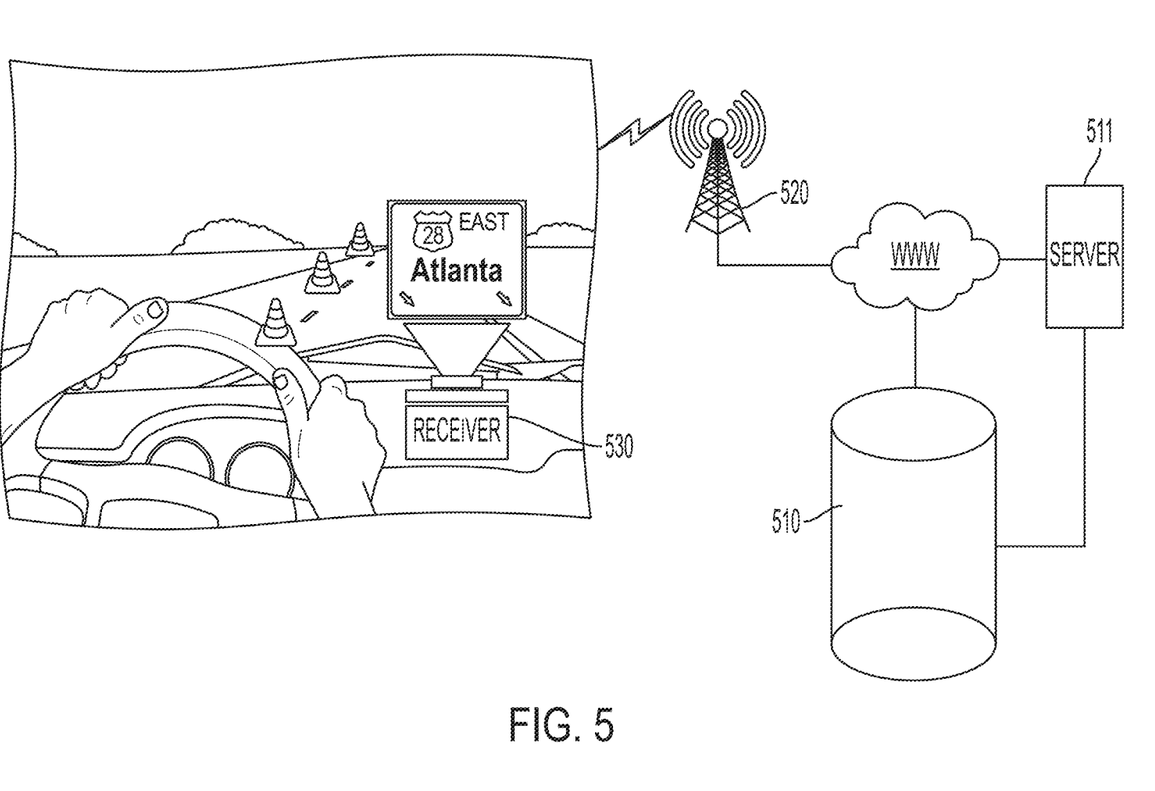
FIG. 5 shows the components and exemplary output of a system for presenting location based augmented reality road signs on or within a vehicle in accordance with an emergency vehicle reservation embodiment of the present invention.

Referring now to FIG. 5, an emergency vehicle reservation embodiment of a system 500 for location based augmented reality road signs within a vehicle is implemented through a database 510 that stores information related to the content and location of road signs ("signage information") and road/lane reservation requests, a collection of transmitters 520 deployed in a service area that transmit the signage information, and a receiver 530 installed in each vehicle to receive the transmitted signage information and road/lane reservation requests and cause the display of applicable signage and virtual cones within the vehicle. In this regard, the emergency vehicle reservation embodiment of the system 500 for location based augmented reality road signs within a vehicle functions as the embodiment described above with reference to, inter alia, FIG. 1, but with an integral Value Added Database Server 511. Through the inclusion of the Value Added Database Server 511, the system 500 for location based augmented reality road signs within a vehicle provides value-added services. One such service is road/lane reservation for Authorized Emergency Vehicles ("AEV").

In use, the Value Added Database Server 511 may receive requests from an AEV, such as ambulance, fire, police, and so forth. The request may be generated by the AEV driver at the time the AEV driver is dispatched for service. The request provides the AEV's present location and destination address to the Value Added Database Server 511, which uses such information to retrieve/calculate a driving route. To ensure the authenticity of the request, a previously approved password may be required to be sent to the Value Added Database Server 511 with the request. It is appreciated that the password may be securely pre-saved in the road/lane reservation request interface, which may be embodied as a software application on a mobile computer (such as a smart phone), to save time.

Once an authentic request is received by the Value Added Database Server 511, the Value Added Database Server 511 may reserve, on a real-time basis, a segment of a road/lane along the provided driving route for that portion of the time that an AEV is going to use the road/lane. Such a reservation of a road/lane is done with the Value Added Database Server 511 causing the receivers 530 in a location along the driving route, by way of a signal sent through the transmitters 520, to put virtual icons (such as virtual cones) on a segment of the road to be used by the AEV for the period of the time when the AEV is approaching the location and is passing the location. It is contemplated that the virtual icons may be caused to be displayed by the receivers 530 in the same manner that virtual signs are caused to be displayed. The Value Added Database Server 511 may additionally cause the receivers 530 along the driving route to emit an auditory message for the driver about the forthcoming passing of the AEV. Once the AEV had passed a location, the Value Added Database Server 511 may additionally cause the receivers 530 in that location along the driving route to delete the icons.

In some embodiments, a virtual signage being generated may be projected or otherwise displayed on an existing video display of a vehicle.

It is contemplated that the transmitters may be set to transmit, or stop the transmission of signage legend data, signage template data, and signage location data to cater different time dependent situations, weather dependent situations, or road construction/maintenance dependent situations.

It is contemplated that signage legend data may be transmitted in more than one language, allowing a user direct the user's receiver to select the language of the signage legend to be projected.

In some embodiments, transmitting stations, such as designated cell towers, may be employed as transmitters to transmit area-relevant datasets over a significant area, say radius of 50 km, even if it overlaps with other transmitting stations. Such an arrangement may require the receivers to scan through a larger number of datasets (because datasets over a larger area would be received), but could minimize the number of total transmitters that were required while still providing some level of local area control over data being transmitted.

In embodiments employing transmitting stations or other embodiments where it is desired to provide more data efficiently; (a) data package will incorporate version number so that receivers can determine if it needs to download more current data; (b) dataset packages will contain data changed from prior version segregated such that receiver can determine if the prior version had already been downloaded and only download changes; and (c) when vehicle travels from one coverage area to another, the receiver will download the new dataset and retain the prior data set until vehicle has traveled out of the new coverage area. Such procedures may help prevent the receiver from trying to switch back and forth from transmitting stations when coverage areas overlap.

It is appreciated, however, that dedicated transmitting stations can still be utilized as transmitters rather than cell towers to cover larger areas or for specialized coverage areas. In addition, portable low-power transmitters can be used to broadcast urgent information to vehicles in very localized areas. Receivers may detect the urgent information available and allows it to supersede stored data. For example, construction workers or accident responders can use system to notify proximate vehicles of a current situation and also display detours on real time basis.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for generating location-based messages within a vehicle, comprising the steps of:

receiving by a receiver integral with a vehicle having a present geolocation at least one area-relevant dataset, wherein said at least one area-relevant dataset includes data which defines a signage geolocation which specifies a geographic location at which a location-based message is to be generated, data which defines a signage content which specifies at least characters to be displayed in the location-based message that is to be generated, and data which defines a signage appearance which specifies a plurality of preset combinations of writing color, background color, and shape for the location-based message that is to be generated;

upon receiving the at least one area-relevant dataset, creating a digital road sign image having an appearance and information defined by the data which defines signage appearance and the data which defines the signage content in the at least one area-relevant dataset that was received; and upon the present geolocation of the vehicle coming within a predetermined threshold value of the signage geolocation in the at least one area-relevant dataset that was received causing a display of the digital road sign image by a visual output mechanism integral with the receiver as an augmented reality projection on a windshield of the vehicle such that the display of the digital road sign image corresponds to an arrival at the signage geolocation by the vehicle.

2. The method of claim 1, wherein the display of the road sign image includes causing the road sign image to gradually appear closer on the windshield of the vehicle as the present geolocation of the vehicle approaches the geographic location at which the location-based message is to be generated.

3. The method of claim 1, wherein the appearance of the road sign image is in compliance with the Manual Uniform Traffic Control Devices for Streets and Highways.

4. The method of claim 1, wherein once the augmented reality projection is displayed, said augmented reality projection remains on the windshield of the vehicle for a predetermined duration of time.

5. The method of claim 1, wherein once the augmented reality projection is displayed, said augmented reality projection remains on the windshield of the vehicle until the present geolocation of the vehicle is no longer within the predetermined threshold value of the geographic location at which the location-based message is to be generated.

6. The method of claim 1, wherein said at least one area-relevant dataset is transmitted wirelessly from at least one transmitter having a defined geographic coverage area.

7. The method of claim 6, wherein said at least one transmitter is positioned at a specific geographic location within the defined geographic coverage area.

8. The method of claim 6, wherein said at least one transmitter is configured to transmit said at least one area-relevant dataset wirelessly over the defined geographic coverage area.

9. A method for generating location-based messages within a vehicle, comprising the steps of:
wirelessly transmitting from at least one transmitter having a defined geographic coverage area at least one area-relevant dataset, wherein said at least one area-relevant dataset includes at least data which defines a signage geolocation which specifies a geographic location at which a location-based message is to be generated, data which defines a signage content which specifies at least characters to be displayed in the location-based message, and data which defines a signage appearance which specifies a plurality of preset combinations of writing color, background color, and shape for the location-based message is to be generated;
wherein the geographic location at which a location-based message is to be generated is within the defined geographic coverage area;
receiving by a receiver integral with a vehicle having a present geolocation the at least one area-relevant dataset;
upon receiving the at least one area-relevant dataset, creating a digital road sign image having an appearance and information defined solely by the data which defines signage appearance and the data which defines the signage content in the at least one area-relevant dataset that was received;
upon the present geolocation of the vehicle coming within a predetermined threshold value of the signage geolocation in the at least one area-relevant dataset that was received, causing a display of the digital road sign image by a visual output mechanism integral with the receiver a as an augmented reality projection on a windshield of the vehicle such that the display of the digital road sign image is based on an arrival at the signage geolocation by the vehicle.

10. The method of claim 9, wherein the display of the road sign image includes causing the road sign image to gradually appear closer on the windshield of the vehicle as the present geolocation of the vehicle approaches the geographic location at which the location-based message is to be generated.

11. The method of claim 9, wherein the appearance of the road sign image is in compliance with the Manual Uniform Traffic Control Devices for Streets and Highways.

12. The method of claim 9, wherein once the road sign image is provided by the visual output mechanism, the road sign image remains on the visual output mechanism for a predetermined duration of time.

13. The method of claim 9, wherein once the road sign image is provided, the road sign image remains on the visual output mechanism until the present geolocation of the vehicle is no longer within the predetermined threshold value of the geographic location at which the location-based message is to be generated.

14. The method of claim 9, wherein said at least one transmitter is positioned at a specific geographic location within the defined geographic coverage area.

15. The method of claim 9, wherein said at least one transmitter is configured to transmit said at least one area-relevant dataset wirelessly over the defined geographic coverage area.

16. A method for generating location-based messages within a vehicle, comprising the steps of:
wirelessly transmitting from at least one transmitter having a defined geographic coverage area a plurality of discrete area-relevant datasets, wherein each of said plurality of discrete area-relevant datasets include at least data which defines a signage geolocation which specifies a geographic location at which a location-based message is to be generated, data which defines a signage content which specifies at least characters to be displayed in the location-based message, and data which defines a signage appearance which specifies a plurality of preset combinations of writing color, background color, and shape for the location-based message is to be generated;
receiving by a receiver integral with a vehicle having a present geolocation the plurality of discrete area-relevant datasets;
upon receiving the plurality of discrete area-relevant datasets, creating for each one of the plurality of discrete area-relevant datasets a digital road sign image, wherein the digital road sign image created for each one of the plurality of discrete area-relevant datasets has an appearance and information that is defined by the data which defines signage appearance and the data which defines the signage content in that one of the plurality of discrete area-relevant datasets; and
upon the present geolocation of the vehicle coming within a predetermined threshold value of the signage geolocation for any one of the plurality of area-relevant datasets that were received, causing a display of the digital road sign image created for that one of the plurality of discrete area-relevant datasets by a visual output mechanism integral with the receiver as an augmented reality projection on a windshield of the vehicle such that the display of the digital road sign image is based on an arrival at the signage geolocation in that one of the plurality of discrete area-relevant datasets by the vehicle.

17. The method of claim 16, wherein the at least one transmitter is positioned at a specific geographic location within the defined geographic coverage area.

18. The method of claim 17, wherein the appearance of the road sign image is in compliance with the Manual Uniform Traffic Control Devices for Streets and Highways.

19. The method of claim 18, wherein the display of the road sign image includes causing the road sign image to gradually appear closer on the windshield of the vehicle as the present geolocation of the vehicle approaches the geographic location at which the location-based message is to be generated.

20. The method of claim 18, wherein once the augmented reality projection is displayed, said augmented reality projection remains on the windshield of the vehicle until at least one of a running of predetermined duration of time and the present geolocation of the vehicle is no longer within the predetermined threshold value of the geographic location at which the location-based message is to be generated.

* * * * *